United States Patent
Grossman et al.

(10) Patent No.: US 12,145,111 B2
(45) Date of Patent: Nov. 19, 2024

(54) METHOD FOR FOAMING ADHESIVE AND RELATED SYSTEM

(71) Applicant: HENKEL AG & CO. KGaA, Duesseldorf (DE)

(72) Inventors: Matthew Grossman, Chesterfield, NJ (US); Nicholas Patterson, Boonton, NJ (US); Robert Sandilla, Valparaiso, IN (US)

(73) Assignee: Henkel AG & CO. KGaA, Duesseldorf (DE)

(*) Notice: Subject to any disclaimer, the term of this patent is extended or adjusted under 35 U.S.C. 154(b) by 423 days.

(21) Appl. No.: 16/733,632

(22) Filed: Jan. 3, 2020

(65) Prior Publication Data
US 2020/0139311 A1 May 7, 2020

Related U.S. Application Data

(63) Continuation of application No. PCT/US2018/044265, filed on Jul. 28, 2018.

(60) Provisional application No. 62/538,221, filed on Jul. 28, 2017.

(51) Int. Cl.
*B01F 23/235* (2022.01)
*B01F 23/23* (2022.01)
*B01F 25/422* (2022.01)
*B01F 25/452* (2022.01)
*B01F 35/71* (2022.01)
*C09J 5/08* (2006.01)

(52) U.S. Cl.
CPC ........ *B01F 23/235* (2022.01); *B01F 23/2319* (2022.01); *B01F 23/2368* (2022.01); *B01F 25/422* (2022.01); *B01F 25/4523* (2022.01); *B01F 35/7176* (2022.01); *C09J 5/08* (2013.01)

(58) Field of Classification Search
CPC ............... B01F 23/235; B01F 23/2319; B01F 23/2368; B01F 25/422; B01F 25/4523; B01F 35/7176; B01F 23/291; B01F 25/43; B01F 35/717613; B01F 35/833; B01F 2215/0431; B01F 2215/0468; C09J 5/08

See application file for complete search history.

(56) References Cited

U.S. PATENT DOCUMENTS

| | | |
|---|---|---|
| 4,474,680 A | 10/1984 | Kroll |
| 4,588,470 A | 5/1986 | Abeggien |
| 5,096,389 A | 3/1992 | Grady |

(Continued)

FOREIGN PATENT DOCUMENTS

| | | |
|---|---|---|
| CN | 1103353 A | 6/1995 |
| CN | 101537321 A | 9/2009 |

(Continued)

*Primary Examiner* — S. Behrooz Ghorishi
(74) *Attorney, Agent, or Firm* — Sun Hee Lehmann

(57) ABSTRACT

The present invention relates to methods and systems for producing a foamed adhesive. A method for foaming an adhesive includes feeding an adhesive from a supply storage tank to a pump, conveying the adhesive outputted by the pump through an adhesive flow meter, injecting an air into the adhesive once the adhesive travels through the adhesive flow meter, feeding a mixture of the adhesive and air to a static mixer, mixing the mixture homogeneously with the static mixer such that the adhesive is foamed, and transporting the foamed adhesive to a product storage tank.

21 Claims, 1 Drawing Sheet

(56) References Cited

U.S. PATENT DOCUMENTS

| | | | |
|---|---|---|---|
| 5,480,589 A * | 1/1996 | Belser | B01F 25/43231 |
| | | | 261/DIG. 26 |
| 5,874,031 A * | 2/1999 | Okuda | B01F 23/291 |
| | | | 264/45.9 |
| RE37,012 E | 1/2001 | Fiorentini et al. | |
| 9,579,449 B2 | 2/2017 | Sharma et al. | |
| 9,713,893 B2 | 7/2017 | VanDalsem et al. | |
| 2009/0030361 A1 * | 1/2009 | Bach | A61L 15/585 |
| | | | 602/42 |
| 2015/0306552 A1 * | 10/2015 | Erban | C09J 5/08 |
| | | | 261/59 |
| 2019/0002661 A1 * | 1/2019 | Volpato | B29B 7/7433 |

FOREIGN PATENT DOCUMENTS

| | | |
|---|---|---|
| CN | 202823195 U | 3/2013 |
| CN | 104364006 A | 2/2015 |
| CN | 105944584 A | 9/2016 |
| JP | H02198659 A | 8/1990 |
| JP | H0389964 | 4/1991 |
| JP | HO394851 A | 4/1991 |
| JP | H10506572 | 6/1998 |
| JP | 2011515254 | 5/2011 |
| JP | 2015525270 | 9/2015 |
| WO | 9609881 | 4/1996 |
| WO | WO-2004007063 A1 * | 1/2004 ............ B01F 5/0616 |
| WO | 2009120677 | 10/2009 |

\* cited by examiner

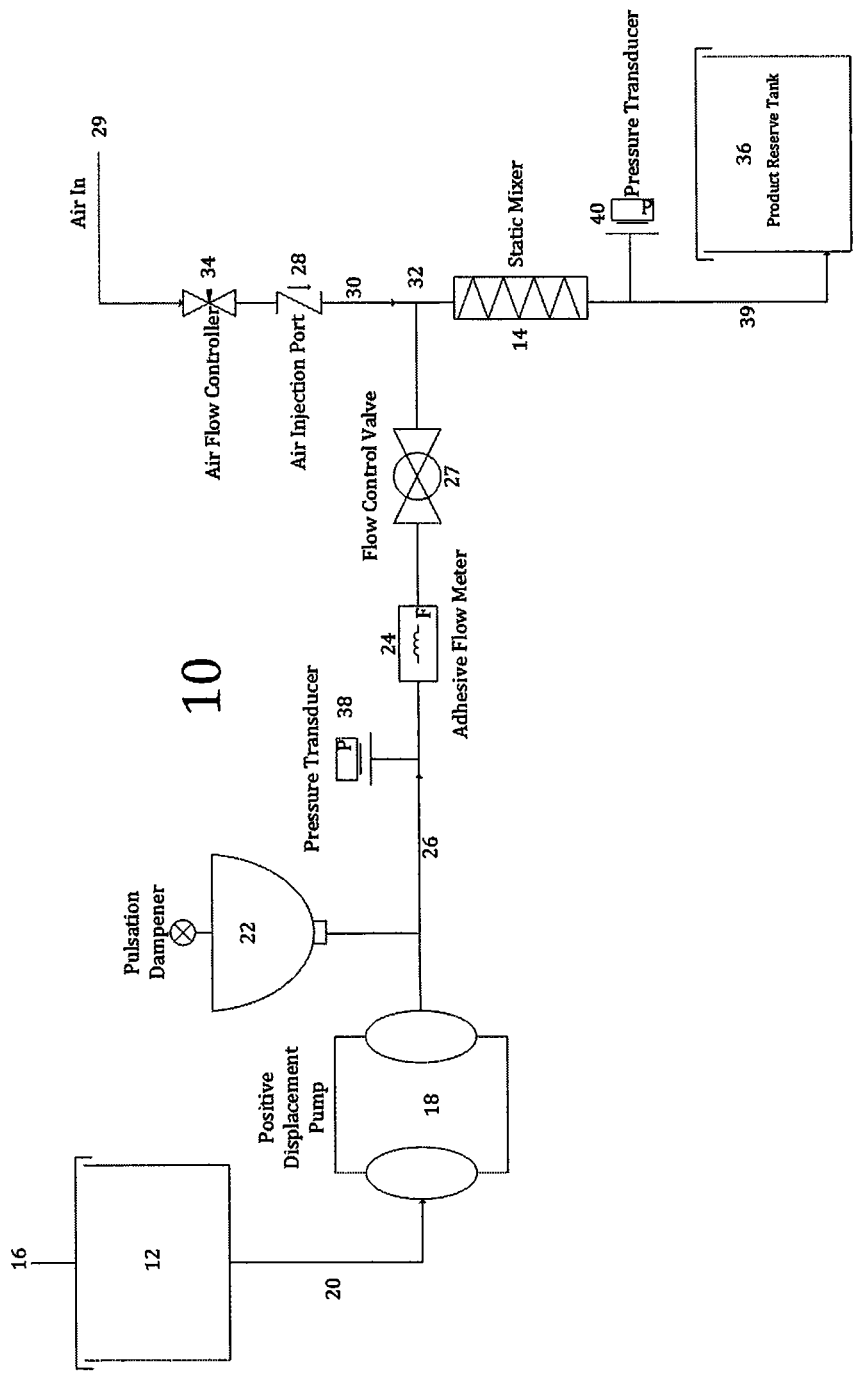

METHOD FOR FOAMING ADHESIVE AND RELATED SYSTEM

FIELD OF THE INVENTION

The present invention relates to methods and systems for producing a foamed adhesive.

BACKGROUND OF THE INVENTION

Currently, there exist various systems and methods for mixing a liquid material (e.g., adhesive) and a gas (e.g. air) with a high intensity to produce a foamed adhesive to be used in various applications.

All of the currently available foaming adhesive systems utilize a rotor/stator system with a motor powering the rotor. The rotor/stator is typically referred to as a mix head. Generally, in this arrangement, the motor and the mix head are separated by double mechanical seals. Double mechanical seal of this type has finite life cycle. This often causes the system to have a failure and be inoperable until the seals are replaced. The double mechanical seals also need to be cooled by pressurized coolant fluid at all time to avoid its malfunction.

To prolong the life of the mechanical seals, devices, such as pulsation dampeners, surge suppressors, and non-reciprocating positive displacement pumps, have been used. However, these devices only delay the double mechanical seals failure and do not address the fundamental problem of the system failure.

Current static mixing technology focuses on liquid-liquid blending or liquid-gas blending. Static mixers are used to mix fluids with low viscosities as opposed to high viscosity fluids. Low viscosity fluids can be conveyed in the turbulent flow regime with little resistance to flow (pressure drop). Turbulent flow is key for liquid-liquid and liquid-gas blending in static mixing systems. High viscosity fluids require a significant amount of energy to enter the turbulent flow regime as the resistance to flow (pressure drop) increases with viscosity. This high resistance to flow (pressure drop) creates significant design challenges and operational considerations.

Accordingly, although various systems and methods for foaming adhesive are currently available, further improvements are possible.

SUMMARY OF THE INVENTION

According to an embodiment of the present invention, a foaming adhesive system for mixing an adhesive and air to produce foamed adhesive includes a supply storage tank containing adhesive therewithin, a pump connected to the supply storage tank via a first connecting conduit and configured to output the adhesive received from the supply storage tank to a second connecting conduit, an air supply storage containing air therewithin, the air supply storage connected to the second conduit to inject the air into the adhesive via an air injection port, and a static mixer connected to the second connecting conduit for receiving a mixture of the adhesive and air, the static mixer configured to homogeneously mix the mixture to produce foamed adhesive.

According to a method aspect, a method for foaming an adhesive includes feeding an adhesive from a supply storage tank to a pump, conveying the adhesive outputted by the pump through an adhesive flow meter, injecting an air into the adhesive once the adhesive passes through the adhesive flow meter, feeding a mixture of the adhesive and air to a static mixer, mixing the mixture homogeneously with the static mixer such that foamed adhesive is produced, and transporting the foamed adhesive to a product storage tank.

These and other aspects of the present invention will be better understood in view of the drawings and following detailed description.

BRIEF DESCRIPTION OF THE DRAWINGS

The FIGURE illustrates a schematic representation of a foaming adhesive system and its components, according to an embodiment of the present invention.

DETAILED DESCRIPTION OF PREFERRED EMBODIMENTS

According to an embodiment of the present invention, referring to the FIGURE, there is shown a foaming adhesive system 10 configured to mix a high viscosity material, such as a natural or synthetic polymer based adhesive 12, and a gas at a predetermined ratio to produce a foamed adhesive. The foaming adhesive system 10 incorporates static mixing technology which uses a static mixer 14. This static mixer 14 is a mechanical device normally used for the continuous mixing of fluid materials. Generally, the fluids to be mixed are liquid, but the static mixer 14 can also be used to mix various gases, and a mixture of gas and fluid, as will be described in greater detail below.

Currently, all foaming adhesive systems available in the marketplace uses high power mix head technology which utilizes a dynamic mixer for mixing fluid materials. This technology (dynamic mixer) uses a combination of rotor and stator, which is often referred to as a mix head, with a motor to power the rotor. In addition, mechanical seals are used to separate the motor and the mix head and to prevent leakage.

The foaming adhesive system 10 of the present invention is advantageous since, as stated above, it utilizes the static mixer 14 for foaming the adhesive 12, which requires fewer components than using a dynamic mixer. Specifically, mechanical components, such as motor, rotor, and stator, are not needed in the present invention, thereby enhancing operational safety and longevity of components within the foaming adhesive system 10. In addition, unlike a dynamic mixer where mechanical seals need to be cooled by pressurized coolant fluid at all time, there is no need for mechanical seals and a cooling system in the static mixing technology since no mix head exists in the static mixer 14. Thus, inoperability of the foaming adhesive system caused by a mix head and mechanical seals could be eliminated.

Referring to the FIGURE, the foaming adhesive system 10 includes a supply storage tank 16, in which a high viscosity adhesive 12 is stored. The adhesive 12 suitable for the foaming adhesive device 10 is disclosed in U.S. patent application Ser. No. 14/092,110 and U.S. patent application Ser. No. 13/775,348, the contents of both of which are incorporated herein by reference.

First, the adhesive 12 to be foamed is fed into a pump 18 from the supply storage tank 16 via a first connecting conduit 20 that connects the supply storage tank 16 and the pump 18. Once the adhesive 12 is supplied to the pump 18, the pump 18 outputs the adhesive 12 into a pulsation dampener 22 with a flow and pressure between 50 liters/hour and 2500 liters/hour and between 0 psi and 10,000 psi, respectively.

In the depicted embodiment, the pump 18 is preferably a reciprocating or non-reciprocating positive displacement pump, e.g., air operated double diaphragm pump, air operated piston pump, etc., to move the adhesive 12 to the pulsation dampener 22. The pump 18 may be operated on compressed air or electricity and controlled by a programmable logic controller (not shown). The pulsation dampener 22 is preferably applied immediately downstream of the pump 18 to minimize pulsations and pressure fluctuations caused by the pump 18, thereby ensuring smooth flow of the adhesive 12.

The adhesive 12 is then conveyed through an adhesive flow meter 24 via a second connecting conduit 26 that connects the pump 18 and the static mixer 14. The adhesive flow meter 24 measures the flow rate and mass of the adhesive 12 flowing through the second connecting conduit 26 and into the static mixer 14. The adhesive flow meter 24 includes a flow control valve 27 which responds to signals generated by the adhesive flow meter 24 to regulate the flow or pressure of the adhesive 12 flowing therethrough.

After the adhesive 12 is passed through the adhesive flow meter 24, air is injected into the adhesive 12 at between 0% and 150% of the adhesive flow. Specifically, the air travels from an air supply storage 29 through an air injection port 28 and an air supply line 30 into the adhesive 12 at a junction 32 with an air pressure between 5 and 10,000 psi, preferably, between 50 psi and 1,000 psi. The air flow volume is controlled by an air flow controller 34 which can be set manually or by a programmable logic controller (not shown) based on the adhesive flow rate.

A mixture of the adhesive 12 and air is then fed into the static mixer 14 to be intensively and homogeneously mixed to produce bubble sizes under 500 microns, and preferably from about 15 microns to about 150 microns. In the present embodiment, the static mixer 14 is non-helical and preferably is a corrugated plate or x-grid type of any size with any number of mixing elements, with the mixing elements having either a rotated or aligned configuration. Once the mixing is completed and foamed adhesive is produced, it exits the static mixer 14 and is delivered to a product reserve tank 36 (unpressurized or pressurized) via a third connecting conduit 39 that connects the static mixer 14 and the product reserve tank 36.

The static mixer 14 is non-helical, as stated above, as conventional helical mixers do not produce quality foam as they most often operate in the laminar flow regime. Helical mixers produce plug flow in the mixer and continually slice the fluid to mix and do not induce turbulent flow. All mixers that do not follow this principle are categorized as non-helical static mixers, which include oblique angle type static mixers.

The foaming adhesive system 10 further includes first and second pressure transducers 38, 40 located between the pump 18 and the adhesive flow meter 24, and the static mixer 14 and the product reserve tank 36, respectively. The first and second pressure transducers 38, 40 measure the pressure of the adhesive 12 flowing through the first connecting conduit 20 and the pressure of the foamed adhesive flowing through the third connecting conduit 39, respectively.

The foaming adhesive system's on/off cycle (not shown) is controlled by a human operator through a human machine interface (not shown) in addition to a control logic. The foaming adhesive system 10 starts and stops conveying the adhesive 12 and air when the application process demands for product.

From the foregoing, it will be appreciated that a foaming adhesive system according to the present invention produces a foamed adhesive while enhancing operational safety and longevity of the foaming adhesive system.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A method for foaming an adhesive, the method comprising:
   pumping, using a pump, the adhesive from a supply storage tank through a first conduit;
   dampening, using a pulsation dampener downstream of the pump, pulsations and pressure fluctuations of the adhesive flowing in the first conduit;
   measuring, using an adhesive flow meter downstream of the pulsation dampener, a flow rate and/or mass of the adhesive flowing in the first conduit;
   regulating, using a flow control valve downstream of the adhesive flow meter, and based on the measured flow rate and/or mass of the adhesive flowing in the first conduit, the flow of adhesive to a junction that connects the first conduit to a gas supply line;
   supplying gas to the gas supply line that terminates at the junction;
   controlling, using a gas flow controller along the gas supply line, and based on the measured flow rate and/or mass of the adhesive flowing in the first conduit, gas flow volume injected into the adhesive at the junction to form a mixture of the adhesive and the gas;
   supplying the mixture of the adhesive and the gas to a non-helical, static mixer downstream from the junction, the non-helical, static mixer being distinct from the first conduit;
   mixing the mixture, in the non-helical, static mixer, to form a foamed adhesive having bubbles sized between 1 micron and 500 microns; and
   supplying, via a second conduit downstream and distinct from the non-helical, static mixer, the foamed adhesive to a product reserve tank.

2. The method according to claim 1, wherein the non-helical, static mixer is at least one of a corrugated plate type static mixer, a x-grid type static mixer, or an oblique angle type static mixer.

3. The method according to claim 1, wherein the pump is a positive displacement pump.

4. The method according to claim 1, wherein the pump is operated via compressed air or electricity.

5. The method according to claim 1, wherein the gas is injected into the adhesive at a pressure between 5 psi and 10,000 psi.

6. The method according to claim 5, wherein the gas is injected into the adhesive at a pressure between 50 psi and 1,000 psi.

7. The method according to claim 1, wherein the gas is injected into the adhesive via an air injection port.

8. The method according to claim 1, wherein the bubbles are sized between 15 microns and 150 microns.

9. The method according to claim 1, wherein the gas is air.

10. The method according to claim 1, further comprising measuring, using a first pressure transducer between the pulsation dampener and the adhesive flow meter, a pressure of the adhesive flowing in the first conduit.

11. The method according to claim 10, further comprising measuring, using a second pressure transducer between the non-helical, static mixer and the product reserve tank, a pressure of the foamed adhesive flowing through the second conduit.

12. The method according to claim 1, wherein the gas flow rate injected into the adhesive is between 0% and 150% of the flow rate of the adhesive.

13. The method according to claim 1, wherein the adhesive is pumped thought the first conduit at a flow rate between 50 liters/hour and 2500 liters/hour.

14. The method according to claim 1, wherein the adhesive is pumped thought the first conduit at a pressure between 0 psi and 10,000 psi.

15. A foaming adhesive system for mixing an adhesive and gas to produce foamed adhesive, the foaming adhesive system comprising:
a supply storage tank containing adhesive;
a pump connected to the supply storage tank via a first conduit and configured to pump the adhesive from the supply storage tank to the first conduit;
a pulsation dampener downstream of the pump, the pulsation dampener configured to dampen pulsations and pressure fluctuations of the adhesive flowing in the first conduit;
an adhesive flow meter downstream of the pulsation dampener, the adhesive flow meter configured to measure a flow rate and/or mass of the adhesive flowing in the first conduit;
a flow control valve downstream of the adhesive flow meter, the flow control valve configured to regulate the flow of adhesive to a junction that connects the first conduit to a gas supply line based on the measured flow rate and/or mass of the adhesive flowing in the first conduit;
a gas supply storage containing the gas;
the gas supply line fluidly connected to the gas supply storage and terminating at the junction,
a gas flow controller along the gas supply line, the gas flow controller configured to control gas flow volume injected into the adhesive at the junction to form a mixture of the adhesive and the gas based on the measured flow rate and/or mass of the adhesive flowing in the first conduit;
a non-helical, static mixer downstream from the junction, the non-helical, static mixer configured to receive the mixture of the adhesive and the gas and homogeneously mix the mixture of the adhesive and the gas to produce a foamed adhesive having bubbles sized between 1 micron and 500 microns; and
a product reserve tank configured to receive the foamed adhesive from the non-helical, static mixture.

16. The foaming adhesive system according to claim 15, wherein the static mixer is at least one of a corrugated plate type static mixer, a x-grid type static mixer, or an oblique angle type static mixer.

17. The foaming adhesive system according to claim 15, wherein the pump is a positive displacement pump.

18. The foaming adhesive system according to claim 15, further comprising a first pressure transducer between the pulsation dampener and the adhesive flow meter, the first pressure transducer being configured to measure a pressure of the adhesive flowing in the first conduit.

19. The foaming adhesive system according to claim 18, further comprising a second pressure transducer between the non-helical, static mixer and the product reserve tank, the second pressure transducer being configured to measure a pressure of the foamed adhesive.

20. The foaming adhesive system according to claim 15, wherein the gas is air.

21. The foaming adhesive system according to claim 15, wherein the gas flow controller is configured to control the gas flow rate injected into the adhesive to be between 0% and 150% of the flow rate of the adhesive.

* * * * *